(12) United States Patent
de Jong et al.

(10) Patent No.: US 7,063,770 B2
(45) Date of Patent: *Jun. 20, 2006

(54) METHOD OF REMOVING HIGH DENSITY STICKIES FROM SECONDARY PAPERMAKING FIBERS

(75) Inventors: Robert L. de Jong, Appleton, WI (US); Richard L. Sleeter, Jr., Corvallis, OR (US); Robert J. Kellogg, Albany, OR (US)

(73) Assignee: Georgia-Pacific Corporation, Atlanta, GA (US)

( * ) Notice: Subject to any disclaimer, the term of this patent is extended or adjusted under 35 U.S.C. 154(b) by 431 days.

This patent is subject to a terminal disclaimer.

(21) Appl. No.: 10/099,610

(22) Filed: Mar. 15, 2002

(65) Prior Publication Data

US 2002/0129909 A1  Sep. 19, 2002

Related U.S. Application Data

(63) Continuation-in-part of application No. 09/772,395, filed on Jan. 30, 2001, now Pat. No. 6,416,622.

(60) Provisional application No. 60/180,348, filed on Feb. 4, 2000.

(51) Int. Cl.
*D21D 5/18* (2006.01)
*D21D 5/24* (2006.01)

(52) U.S. Cl. ............... 162/55; 162/4; 162/380; 209/729

(58) Field of Classification Search ............... 162/4–8, 162/55, 57–59, 380, 336, 14, 17; 209/162, 209/429, 725–734, 17; 241/28, 21, 24.1, 241/29

See application file for complete search history.

(56) References Cited

U.S. PATENT DOCUMENTS

| | | | |
|---|---|---|---|
| 4,272,315 A | 6/1981 | Espenmiller | 162/4 |
| 4,983,258 A * | 1/1991 | Maxham | 162/189 |
| 5,234,543 A * | 8/1993 | Markham et al. | 162/5 |
| 5,240,621 A | 8/1993 | Elonen et al. | 210/787 |
| 5,580,446 A | 12/1996 | Markham | 210/202 |
| 5,587,048 A | 12/1996 | Streisel et al. | 162/7 |
| 5,693,222 A | 12/1997 | Galvan et al. | 210/194 |
| 5,707,489 A | 1/1998 | Von Grumbkow et al. | 162/4 |
| 5,882,475 A * | 3/1999 | Vikio et al. | 162/4 |
| 6,416,622 B1 * | 7/2002 | Jong | 162/55 |

FOREIGN PATENT DOCUMENTS

| | | |
|---|---|---|
| DE | 31 16 905 A1 | 11/1982 |
| EP | 0 570 757 A1 | 11/1993 |
| EP | 0 931 872 A1 | 7/1999 |
| EP | 0 931 873 A1 | 7/1999 |

* cited by examiner

*Primary Examiner*—Eric Hug
(74) *Attorney, Agent, or Firm*—Michael W. Ferrell

(57) ABSTRACT

A hybrid method for processing papermaking fibers to remove high density stickies typically includes utilizing a multistage array of forward cleaners coupled with a flotation cell which increases overall efficiency of the system. In a preferred embodiment, a first rejects aqueous stream from a first stage bank of centrifugal cleaners is treated in a flotation cell before being fed to a second stage bank of centrifugal cleaners. With the improved technique, the accepts from the first stage bank of centrifugal cleaners may be combined with the accepts from the second stage bank of centrifugal cleaners and fed forward to a thickening device, for example. The technique is also suitably employed for removing stickies from material which has already been screened with a fine screen.

14 Claims, 7 Drawing Sheets

US 7,063,770 B2

METHOD OF REMOVING HIGH DENSITY STICKIES FROM SECONDARY PAPERMAKING FIBERS

CROSS-REFERENCE TO RELATED APPLICATIONS AND CLAIM FOR PRIORITY

This application is a continuation-in-part application of Application Ser. No. 09/772,395, filed Jan. 30, 2001, now U.S. Pat. No. 6,416,622, which in turn was based upon Provisional Application Ser. No. 60/180,348, filed Feb. 4, 2000. The priority of the foregoing applications, both entitled "Hybrid Multistage Forward Cleaner System With Flotation Cell", is hereby claimed.

TECHNICAL FIELD

The present invention relates generally to papermaking fiber processing and more particularly to a method useful for removing stickies from secondary or recycle paper pulp by incorporating a hybrid multistage forward cleaner system with an integrated flotation cell. The method is particularly effective for removing stickies that have already passed through a screening stage.

BACKGROUND

Processing of papermaking fibers to remove contaminants is well known in the art, including the use of forward cleaners and flotation cells. Such technology is used, for example, to treat secondary (recycle) fiber sources for re-use in paper products such as towel and tissue, paperboard, coated writing and printing papers and so forth. Equipment utilized includes screening devices, flotation cells and the like as may be seen, for example, in U.S. Pat. Nos. 4,272,315 to Espenmiller; 4,983,258 to Maxham; 5,240,621 to Elonen et al.; and 5,693,222 to Galvan et al.

Recycling paper into secondary pulp suitable for re-use in high quality products is a relatively complex, capital intensive undertaking as will be appreciated from U.S. Pat. No. 5,587,048 to Streisel et al. The basic cleaning sequence of the '048 patent is as follows: (1) detrashing—the detrasher contains 6 mm (¼ inch) holes and retains large contaminants, such as plastic bags, pieces of wood, large staples, pieces of metal and packing tape, detrashing typically takes place at 3–5% solids; (2) high-density cleaning—heavy, coarse contaminants, such as bolts, staples and rocks are removed, high density cleaning typically takes place at about 3–4% solids; (3) primary coarse screening—primary coarse screens contain holes 2–3 mm in size, preferably 2.4 mm, for removing medium-sized contaminants, such as small fragments of wood, tape and styrofoam, coarse screening at this stage protects fine slotted screens downstream from being overwhelmed by contaminants that are large relative to the slot width, and results in improvement in quality and production rates, coarse screening typically takes place at about 2.5–3.5% solids; (4) secondary coarse screening—the rejects from the primary coarse screening may be screened again using holes of the same size, but at a lower consistency, about 1.5–2.5% solids; (5) sand cleaning (centrifugal)—sand cleaning at this stage protects the fine slotted screens downstream from excess wear, waste corrugated paperboard contains relatively large amounts of sand, cleaning ahead of the screen increases the cost of the system, and increases the requirements for hydraulic capacity, sand cleaning typically takes place at about 1% solids; (6) screening—fine slotted screens are used with a width of 0.008 inch (0.20 mm), rather than 0.012 inch previously used for corrugated paperboard, the fine screens remove plastic slivers, wax and stickie agglomerates, screening takes place at less than 1% solids, preferably less than 0.9%; (7) Lightweight Cleaning (Gyrocleaning)—lightweight cleaning preferentially removes materials with a specific gravity below 1.0, such as plastics, waxes and stickies, not heretofore removed, lightweight cleaning is performed at about 0.8% solids.

It should be appreciated from the '048 patent that existing methods for handling stickies removal were based on removing light contaminants having a density generally less than the fiber being cleaned. Such methods have been found inadequate when a significant amount of heavy stickies are present.

The disclosures of the foregoing patents are hereby incorporated by reference.

SUMMARY OF INVENTION

In the past there were mainly small light weight stickies that managed to get through screens, and most of these small light weight stickies were subsequently removed by the gyro-cleans. More recently, heavy weight stickies started becoming a problem; presumably because some of the new pressure sensitive adhesives tend to form heavy weight stickies. The small heavy weight stickies, which managed to get through screens, were also accepted by the gyro-cleans or reverse cleaners, but they were subsequently rejected with alot of fiber by the forward cleaners. Since the heavy weight stickies from the forward cleaners are still hydrophobic, it is possible to selectively remove them with a flotation cell after the hydrophobic particles attach themselves to air bubbles in the flotation cell.

The heavy weight stickies are difficult to remove by flotation if they lose their hydrophobic properties during the deinking process (e.g., due to the addition of dispersing chemicals) or if the flotation cell is operated inefficiently (e.g., at too high a consistency or with insufficient air bubbles or due to inadequate contact between stickies and air bubbles).

One advantage of having the flotation cell on the forward cleaner rejects is that it is possible to keep the consistency low, since only 10–30% of the total flow is being treated (the percentage depends on reject flow amount). If all the stock is treated in a flotation cell, the tendency is to raise the consistency from 0.5–0.6% to 1% or higher to keep the size and cost of the equipment down. If the design consistency is already 1%, the heavy weight stickies removal efficiency becomes even worse when the consistency rises above 1% due to production increases. By installing a flotation cell on the forward cleaner rejects in an existing process, it is possible to design the hybrid cleaner flotation cell system at 0.5–0.6% consistency and obtain improved heavy weight stickies removal efficiency.

The present invention generally includes a method of processing secondary fiber to remove high density stickies which have a density generally greater than the fiber including: (a) processing a fiber feed stream to generate a rejects stream enriched in high density stickies and (b) treating the rejects stream enriched in high density stickies with a flotation stage to generate an intermediate flotation purified stream with a reduced high density stickies content. Preferably, the feed stream is initially processed by way of a centrifugal separation technique, such as feeding the stream to a bank of hydrocyclones, which generate a rejects stream enriched in high density stickies. The high density stickies typically have a characteristic area (that is, projected maximum cross-sectional area) of less than about 0.5 mm$^2$, and usually less than about 0.3 mm$^2$. The treatment by the flotation stage is effective to remove at least about 40 percent of the high density stickies present and, in most cases, at least about 50 percent. The high density stickies are believed to be derived from pressure sensitive adhesives.

In another aspect of the invention there is provided a method of thin stock processing secondary fiber to remove high density stickies having a density generally greater than the fiber includes the steps of: (a) processing a feed thin stock stream at a consistency of less than about 2.5%, preferably less than about 1%, to generate a thin stock accepts stream and a thin stock rejects stream, the thin stock rejects stream being enriched in high density stickies; and (b) treating the thin stock rejects stream enriched in high density stickies to generate an intermediate flotation purified stream.

The present invention provides in still another aspect a hybrid system for processing papermaking fibers and includes a multistage array of forward cleaners coupled with a flotation cell which increases overall efficiency of the system. In a typical embodiment, a first rejects aqueous stream from a first stage bank of centrifugal cleaners is treated in a flotation cell before being fed to a second stage bank of centrifugal cleaners. The accepts stream of the first stage bank of centrifugal cleaners is fed forward as is the accepts stream of the second stage bank of centrifugal cleaners. Preferably, the two accepts streams are combined.

One advantage of feeding the second accepts stream forward is that it does not have to be returned to the first bank of cleaners for re-cleaning. This reduces the size of the first bank of cleaners or allows an existing installation to operate at a lower consistency. (The cleaners operate more efficiently at a low consistency of 0.5% than at 0.8 or 1%). Another advantage is that the flotation cell typically operates at greater than 60% efficiency on removing hydrophobic contaminants from the first cleaner rejects, while another cleaner stage removes less than 50% of the hydrophobic contaminants. As a result a large quantity of hydrophobic contaminants are removed in the flotation stage, which makes the remaining cleaner stages work more efficiently with less good fiber loss.

As will be appreciated by one of skill in the art, the size and cost of a flotation stage for treating secondary fiber can be reduced by up to 75% if it is installed in centrifugal cleaner system as compared to a full scale treatment of the stock by flotation. The centrifugal cleaner system modeling indicates a 34% reduction in ink speck area of total centrifugal cleaner system accepts by removing ink specks from the first stage rejects with 80% efficiency in a flotation stage and then feeding the flotation accepts forward after centrifugal cleaning of the second stage. (24% reduction if second stage rejects are treated in a similar manner). The ability to feed the centrifugal cleaner rejects forward (after the flotation stage and additional centrifugal cleaning in the next stage) reduces the stock consistency in the first stage, thereby improving the efficiency of the first stage. The capacity of the system is also increased by feeding the second stage centrifugal cleaner accepts forward. The other centrifugal cleaner stages can also be operated more efficiently since more than 50% of the ink in the first stage centrifugal cleaner rejects has been removed in the flotation stage. When the centrifugal cleaner accepts are thickened in a press, a large amount of ink ends up in the pressate. This ink can also be removed by using the ink-laden pressate as dilution water for the centrifugal cleaner rejects going to the flotation stage.

A conventional centrifugal cleaner system (as shown in FIG. 1) normally consists of several stages, whereby the rejects of each centrifugal cleaner stage are diluted for cleaning in the next stage and the centrifugal cleaner accepts are fed backwards to the feed of the previous stage. The ink speck removal efficiency of the centrifugal cleaner is usually much less than 50% on toner inks in office waste paper. As a result the total centrifugal cleaner system ink speck removal efficiency can drop to 30% or less on a furnish containing a large proportion of office waste.

By sending the first or second stage centrifugal cleaner rejects to a flotation stage (as shown in FIG. 2) it is possible to remove a much higher percentage of the ink specks in office waste. (It was possible to obtain 80% removal of ink specks during a pilot plant trial with a flotation cell operated on second stage centrifugal cleaner rejects.) If the accepts of the flotation cell are cleaned in the next centrifugal cleaner stage, the centrifugal cleaner accepts from that stage can then be fed forward to the thickener. Sending centrifugal cleaner accepts forward reduces the load and improves the efficiency of the previous centrifugal cleaner stage.

The present invention is particularly useful in connection with removing stickies from a thin stock recycle fiber product stream; likewise, it is believed pitch removal is enhanced. Stickies are generally a diverse mixture of polymeric organic materials which can stick on wires, felts or other parts of paper machines, or show on the sheet as "dirt spots" or holes. The sources of stickies may be pressure-sensitive adhesives, hot melts, waxes, latexes, binders for coatings, wet strength resins, or any of a multitude of additives that might be contained in recycled paper. The term "pitch" normally refers to deposits composed of organic compounds which are derived form natural wood extractives, their salts, coating binders, sizing agents, and defoaming chemicals existing in the pulp. Although there are some discrete characteristics, there are common characteristics between stickies and pitch, such as hydrophobicity, low surface energy, deformability, tackiness, and the potential to cause problems with deposition, quality, and efficiency in the process. Indeed, it is possible with the present invention to reduce stickies by 50%, 80% or even more by employing a flotation cell in a multistage forward cleaner system as hereinafter described in detail. The rejects from the flotation stage are so full of ink, ash and stickies that they can be rejected without any further treatment.

As will be appreciated from the discussion which follows, a preferred method of cleaning recycle pulp includes combining the accepts from a first centrifugal stage with the accepts from a second centrifugal stage which is fed with the flotation-purified rejects of the first stage. The process is particularly effective for removing relatively heavy weight (small size) hydrophobic stickies that have already passed through a screening stage. This will increase productivity of a paper machine utilizing the pulp and decrease paper machine downtime and converting downtime. Stickies build up on wires or fabrics and cause holes to form in the sheet requiring downtime on the paper machine to remove them. Stickies also build up on doctor blades in paper machines and get into the dewatering felt and so forth. In converting, they can cause problems such as sheets sticking together. They clog emboss rolls and interfrere with the proper operation of other rolls, cause holes in the sheet and so on. Solvents are typically required to remove stickies from equipment and this can lead to environmental issues.

In recent years, stickies removal from recycle fiber has become more difficult in many cases. Without intending to be bound by any theory, it is believed that stickies generated from waste paper including pressure-sensitive adhesives become more flexible at typical operating temperatures (40° C.) of screens and thus tend to pass through even fine screens.

The method of the present invention has been employed in a commercial papermill and found to have a dramatic effect on downtime of the mill. Prior to installation and employment of the inventive method of removing contaminants, the plant typically experienced about 10 hours of downtime per month due to stickies. After employment of the claimed process, the plant has run for eight months without a stoppage due to stickies. In preferred embodiments the present invention is thus directed to a method of removing stickies from secondary or recycle fiber.

In one preferred mode of practicing the invention there is provided a method of processing papermaking fibers with a multistage array of forward cleaners including a plurality of centrifugal cleaners configured to generate accepts streams and rejects streams which concentrate hydrophobic contaminants including the steps of: (a) feeding a first aqueous feed stream including papermaking fibers to a first stage bank of centrifugal cleaners of the multistage array; (b) generating a first accepts aqueous stream and a first rejects aqueous stream in the first stage bank of centrifugal cleaners, the first aqueous rejects stream being enriched in hydrophobic contaminants with respect to the first aqueous feed stream; (c) supplying the first rejects aqueous stream to a flotation stage; (d) treating the first rejects aqueous stream in the flotation stage to remove hydrophobic waste from the first aqueous rejects stream and produce an intermediate aqueous purified feed stream; (e) feeding the aqueous purified intermediate feed stream to a second stage bank of centrifugal cleaners of the multistage array, the second centrifugal cleaner being configured to generate a second accepts aqueous stream; and (f) combining the first accepts aqueous stream with the second accepts aqueous stream to form a combined accepts stream. A further step involves thickening the combined accepts stream. Generally, the process is carried out at a consistency of less than about 1%; typically at from about 0.3% to about 0.9%, and preferably at from about 0.4% to about 0.7%. The multistage array of forward cleaners comprises at least 3 banks of centrifugal cleaners in one embodiment.

Hydrophobic contaminants removed from the first aqueous rejects stream by the flotation stage may include an ink composition, such as a toner ink composition.

Typically, the hydrophobic contaminants removed from the first aqueous rejects stream by the flotation stage includes stickies, and may include an ink composition and stickies. The process is also believed unexpectedly effective in removing stickies derived from pressure sensitive adhesives.

In yet another aspect of the invention, there is provided a method of thin stock processing of secondary fiber to remove contaminants including the steps of: (a) screening a first aqueous stream including secondary papermaking fibers having a consistency of less than about 2.5% in a screening device with openings having a screening dimension of less than about 10 mils to generate a screened accepts aqueous stream; (b) feeding the screened accepts aqueous stream to a multistage array of cleaners configured to generate centrifugal cleaner accepts streams and centrifugal cleaner rejects stream which concentrate heavy hydrophobic contaminants, the rejects stream of at least one centrifugal cleaner being fed to another centrifugal cleaner; and (c) processing at least one centrifugal cleaner rejects stream of a centrifugal cleaner of the multistage array with a flotation stage to remove hydrophobic contaminants, the flotation stage thereby generating a flotation purified stream having a reduced hydrophobic contaminants content.

Unless otherwise indicated, terminology appearing herein is given its ordinary meaning; %, percent or the like refers, for example, to weight percent and "consistency" refers to weight percent fiber or solids as that term is used in papermaking. "Mils" refers to thousandths of an inch. The banks of centrifugal cleaners are typically hydrocyclone type cleaners.

BRIEF DESCRIPTION OF DRAWINGS

The invention is described in detail below with reference to numerous examples and the appended Figures wherein like numbers designate similar parts throughout and wherein.

DETAILED DESCRIPTION

Figure 1:
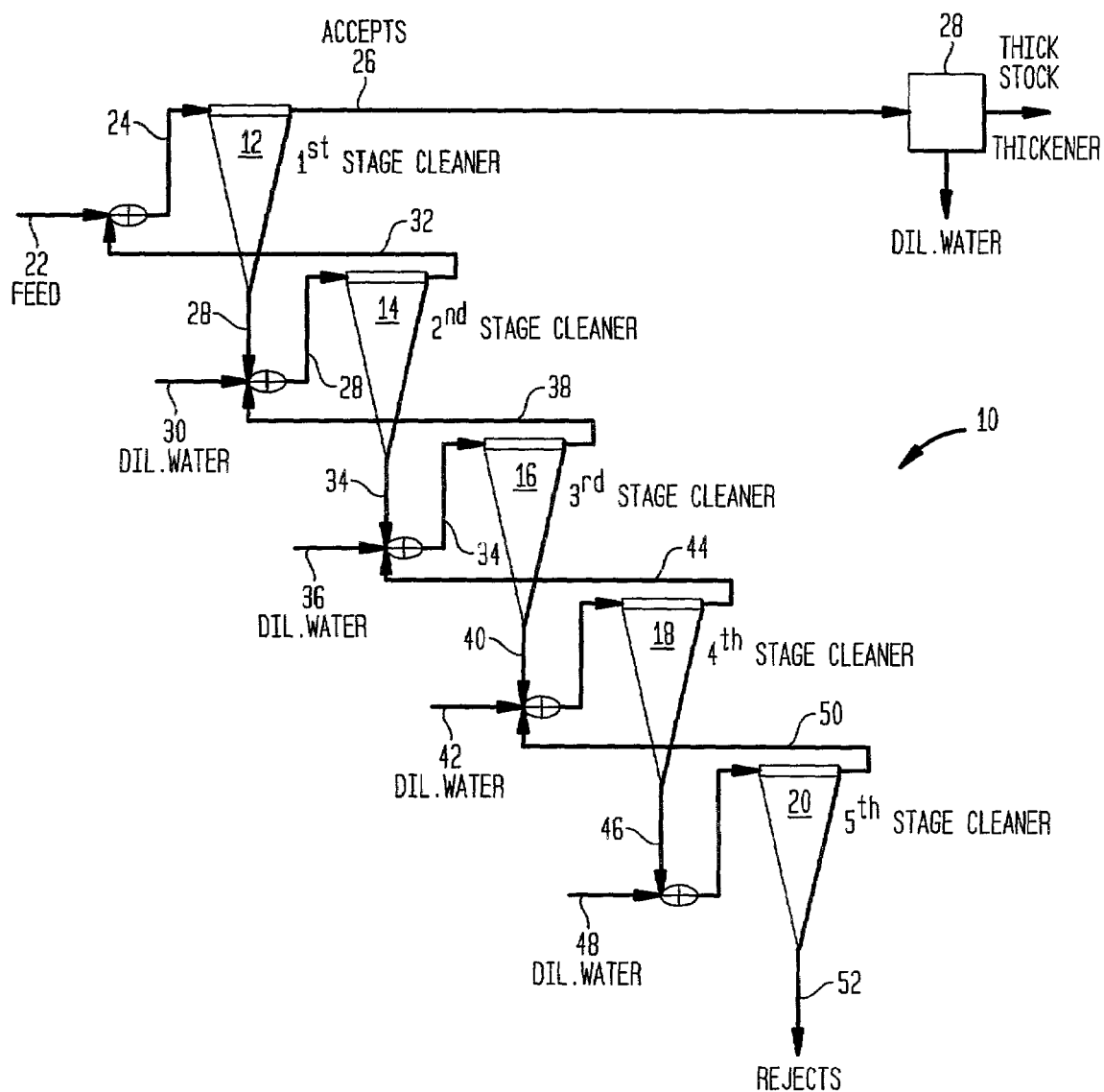
FIG. 1 is a schematic of a conventional multistage forward centrifugal cleaner system wherein each bank of cleaners are designated by a conical element.

The invention is described in detail below for purposes of illustration and exemplification only. Such explanation of particular embodiments in no way limits the scope of the invention which is defined in the appended claims. Referring to FIG. 1, there is shown a conventional forward cleaner system 10 of the type employed at a paper mill, for instance, as part of the cleaning process for processing secondary pulp into paper products. System 10 has five stages 12, 14, 16, 18 and 20 of banks of centrifugal cleaners interconnected in the manner shown. Such connections may include suitable piping, mixing tanks, holding vessels and the like (not shown) as may be convenient for operating the system. Pulp is fed at low consistency to the system at 22 to the first bank of cleaners 12 through inlet 24 and centrifugally treated in the first stage by a bank of hydrocyclones, for example, such that the accepts are fed forward at 26 to a thickener (or another cleaning device) at 28 whereas the rejects, concentrating the heavy, hydrophobic waste in the system are fed to second stage 14 at 28 for further treatment in a second stage made up of a second bank of centrifugal cleaners 14. Diluent water is added to the rejects stream from the first stage as indicated at 30 in an amount suitable for the particular system or operating conditions. Stream 28 (first stage rejects) is thus fed to the second stage cleaners whereupon bank 14 of cleaners generates an accepts stream 32 and a rejects stream 34. Stream 32 is a recycled to the feed 22 and makes up a portion of the material fed to the first stage bank of cleaners 12. The first bank of cleaners may be made up of 50 or more hydrocyclones depending on capacity and performance desired. Subsequent stages will each contain fewer cleaners than the previous stage depending upon the amount of rejects, until the final stage contains less than 10 cleaners.

Stream 34 is again enriched with respect to heavy components (with respect to stream 32) and is fed to the third stage 16 bank of cleaners for further processing. Diluent water may again be added at 36 if so desired to stream 34. Stage 16 generates another accepts stream 38 which is fed back to the second stage (stream 28) and another rejects stream 40 enriched in heavy hydrophobic components.

In like fashion, stream 40 is fed to the fourth stage 18 bank of cleaners at 42 where diluent water may again be added. The fourth stage generates another accepts stream 44 and another rejects stream 46. These streams have the rejects/accepts characteristics noted above.

Stream 46 is fed to yet another stage 20 of forward cleaners at 48 wherein stream 46 is divided into an accepts stream 50 and a rejects stream 52 as indicated on the diagram. Accepts stream 50 is recycled to the fourth stage as shown and rejects stream 52 is discarded or further processed if so desired. There is thus described a conventional forward cleaner system utilizing centrifugal cleaners in cascaded/refluxing fashion to concentrate the waste material and purify the pulp which is fed forward at a papermaking process to a thickening device or a cleaning device such as screens or a reverse cleaner.

In accordance with the present invention, a flotation stage is advantageously integrated into a multistage forward cleaner system to remove hydrophobic material and increase the cleaning efficiency. Flotation utilizes the phenomenon that the minerals which are present in the ground ore can partially be wetted, i.e., they are hydrophilic, while other parts of the minerals are hydrophobic. Hydrophobic particles have a clear affinity to air. Accordingly, finely distributed air is introduced into the solid-water-mixture so that the air will attach to the hydrophobic particles causing them to rise to the surface of the mixture or suspension. The hydrophobic particles, such as valuable minerals or the above-mentioned contaminants present in repulped stock suspensions, collect as froth at the surface of the suspension and are skimmed off with a suitable means such as a paddle or weir. The hydrophilic particles of the ore or stock suspension remain in the flotation vat. It is also possible to separate two or more useful minerals selectively by the flotation method, for example, in the separation of sulfidic lead/zinc ores. For controlling the surface properties of the minerals small amounts of additives of chemical agents are introduced such as, for example, foaming agents which will help to stabilize the air bubbles, so-called collecting agents which actually cause the hydrophobic effect and prepare the mineral particles for attachment to the air bubbles, and floating agents which temporarily impart hydrophilic properties to the hydrophobic minerals and later return the hydrophobic properties for selective flotation, as mentioned above. The latter are generally inorganic compounds, mostly salts, while the collectors are mostly synthetic organic compounds, and the foaming agents are oily or soapy chemicals such as fatty acid soap.

The apparatus of the present invention may utilize a variety of readily available components. The centrifugal cleaners, for example, are available from Ahlstrom (Noormarkku, Finland) or Celleco (Model 270 series) (Lawrenceville, Ga., USA) and are arranged in banks as shown in FIGS. 2–5. The flotation stage, which may be multiple cells, are likewise readily available from Comer SpA (Vicenza, Italy). Comer Cybercel® models FCB1, FCB3 and FCB4 are suitable as discussed further herein.

Figure 2:
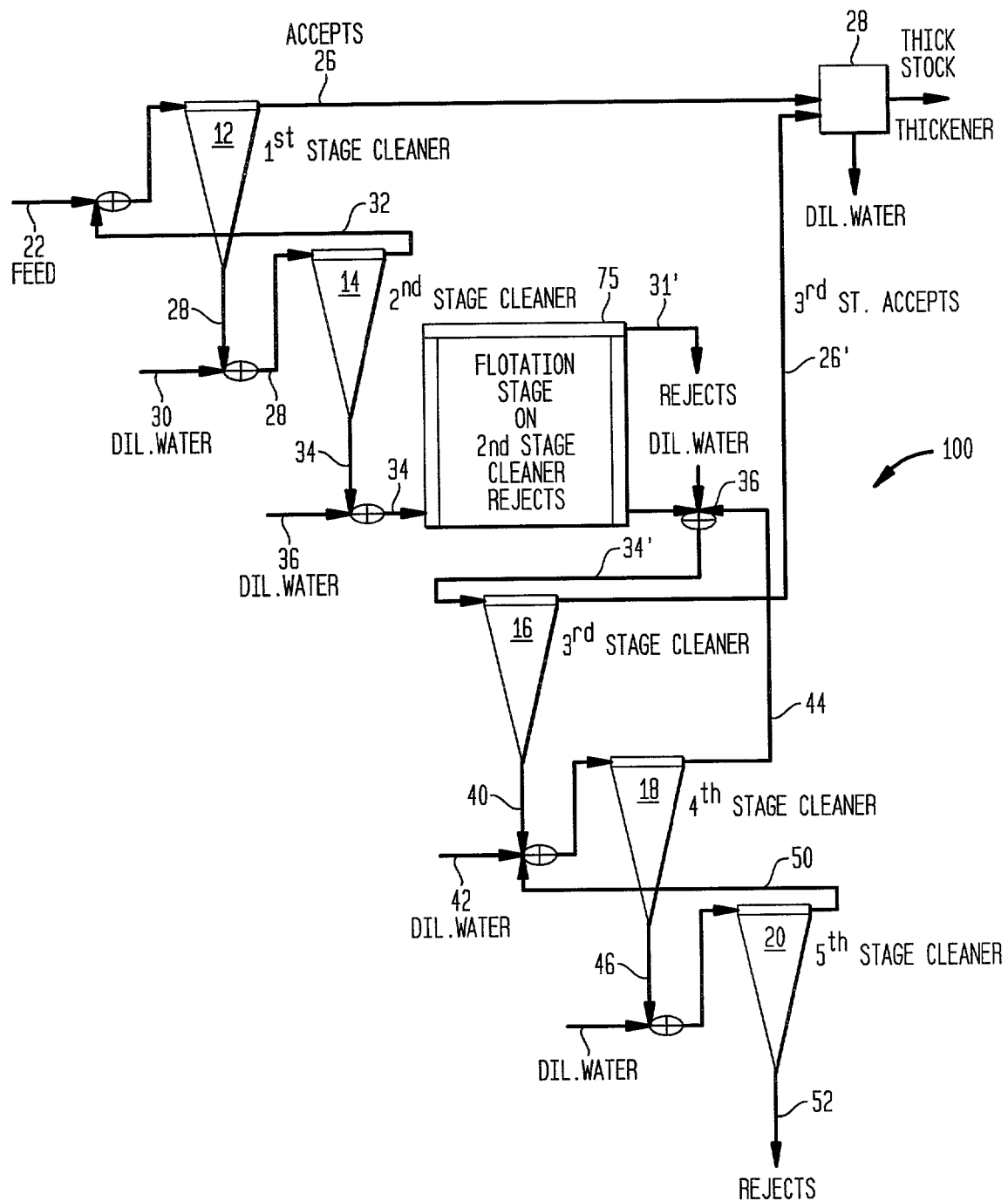
FIG. 2 is a schematic diagram of a hybrid multistage forward cleaner/flotation apparatus and process of the present invention, wherein a flotation stage is provided to treat the second stage rejects stream.

There is illustrated in FIG. 2 an apparatus 100 and method in accordance with the present invention. Apparatus 100 operates similarly to apparatus 10 in FIG. 1. Like parts are given like numbers for purposes of brevity and only differences noted from the discussion above. The system 100 of FIG. 2 operates as described in connection with system 10 of FIG. 1 and is so numbered in the drawing except that system 100 has a flotation stage 75 for treating the rejects stream 34 of second stage cleaner 14. Diluent water may be added at 36 as before, and hereafter, stream 34 is treated in the flotation stage to remove hydrophobic material. The accepts from the flotation stage, that is purified as shown by removing hydrophobic waste from stream 34, is then fed in stream 34' to third stage cleaner 16. Instead of refluxing the accepts from the third stage back to the second stage, the accepts material is fed forward in a product stream 26' for downstream processing. The hydrophobic rejects (31') from flotation stage (75) are removed from system 100.

Figure 3:
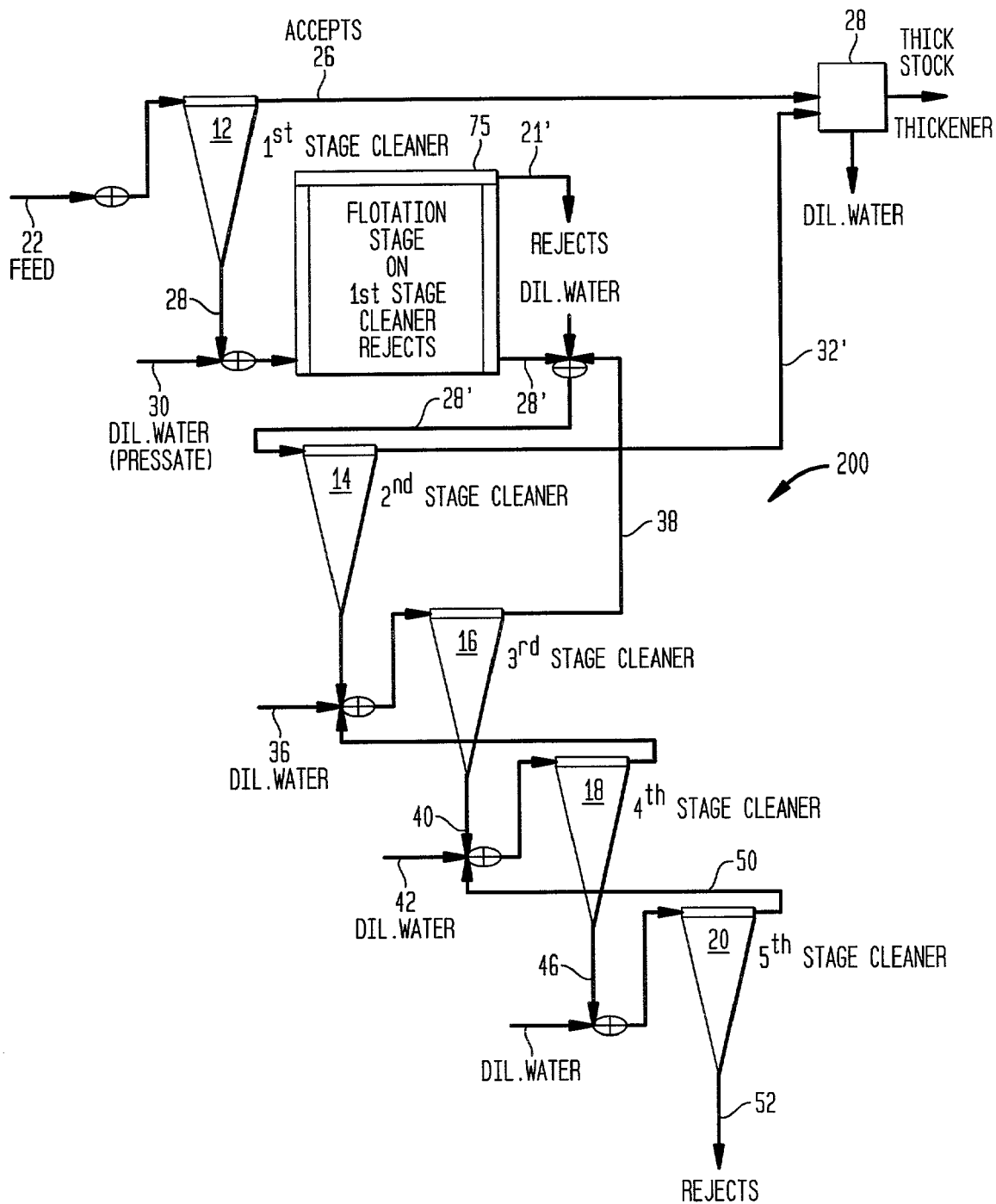
FIG. 3 is a schematic diagram of a hybrid multistage forward cleaner/flotation apparatus and process of the present invention wherein a flotation stage is provided to treat the first stage rejects stream.

In FIG. 3 there is illustrated another apparatus 200 and method of the present invention. Here again similar functioning parts are numbered as in FIGS. 1 and 2, the discussion of which is incorporated by reference here. Apparatus 200 of FIG. 3 differs from apparatus 10 of FIG. 1 in that a flotation stage 75 is added to treat the first stage rejects stream 28 to remove hydrophilic waste to produce an intermediate purified stream 28' which is fed to the second stage bank of cleaners 14. Bank 14 generates a purified accepts stream 32' which is fed forward to the thickening or other device 28 along with stream 26. The hydrophobic rejects (21') from flotation stage (75) are removed from system 200.

Figure 4:
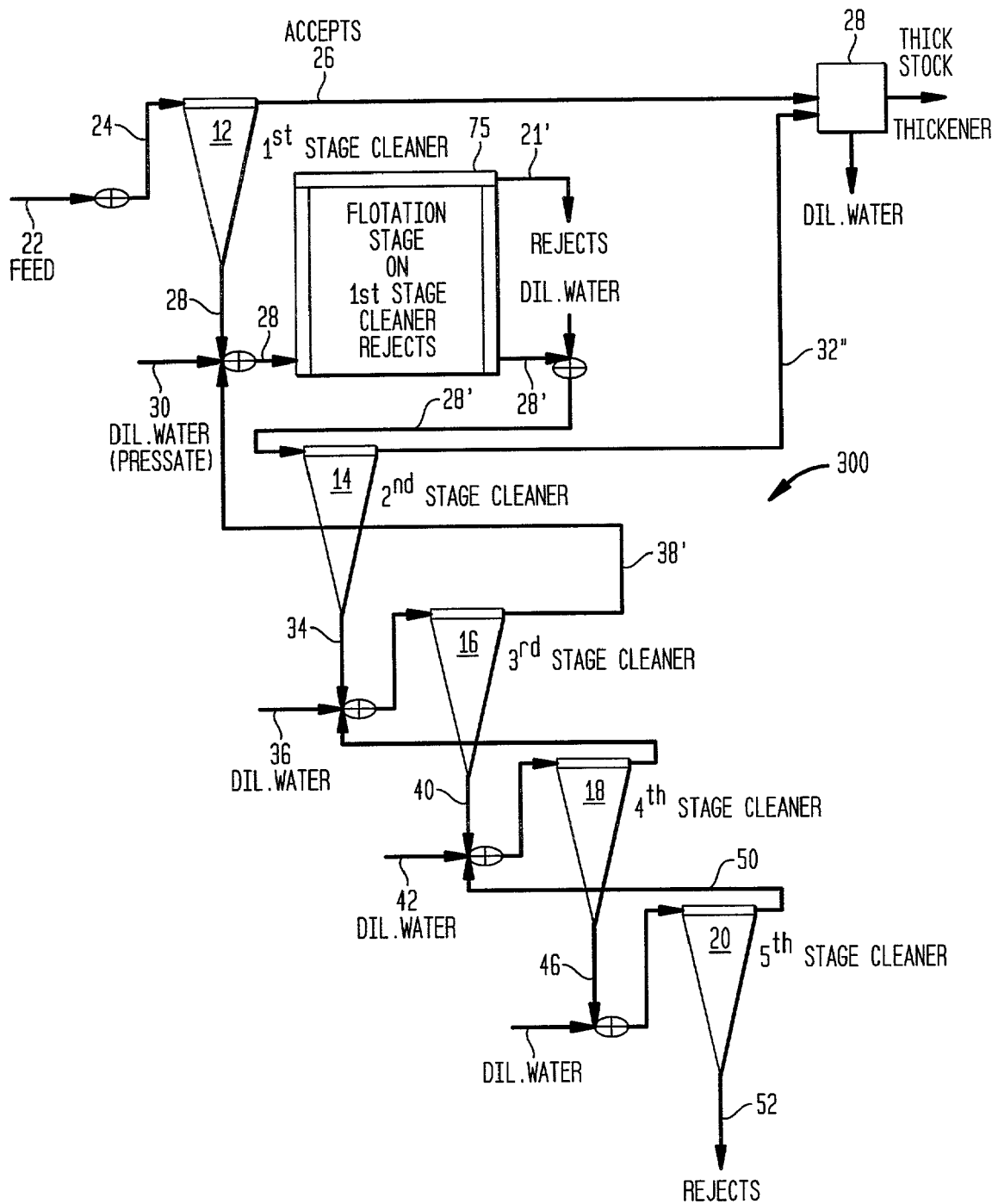
FIG. 4 is a schematic diagram of a hybrid multistage forward cleaner/flotation apparatus and process of the present invention wherein a flotation stage is provided to treat the first stage rejects and third stage accepts.
Figure 5:
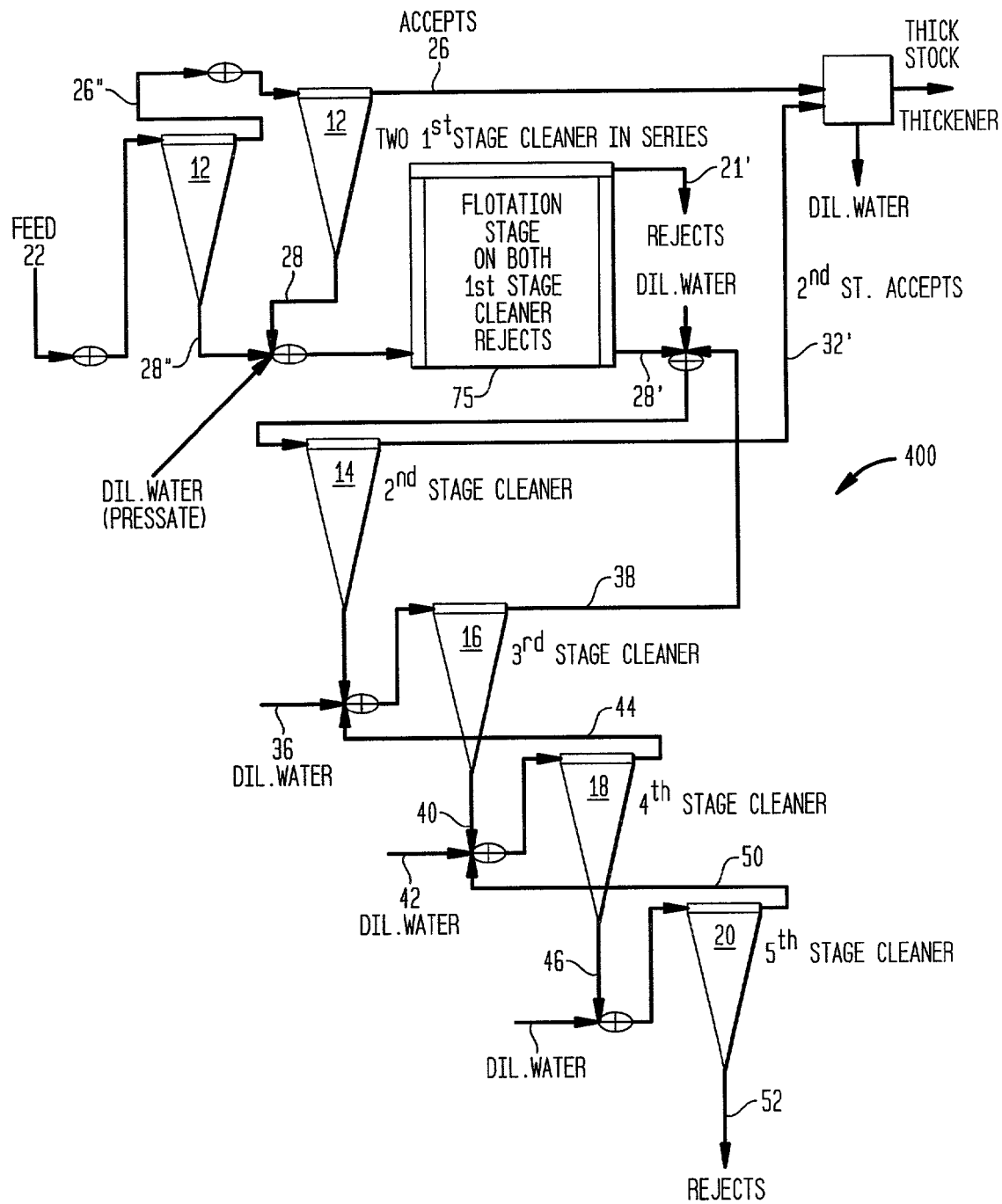
FIG. 5 is a schematic diagram illustrating an apparatus and process of the present invention wherein the hybrid system has dual forward cleaner banks in series and the rejects stream from both of the forward cleaner banks are provided to a flotation cell.

In FIGS. 4 and 5 there are illustrated alternate embodiments of the present invention. Like components are numbered as in FIGS. 1–3 above, the discussion of which is incorporated by reference. In the apparatus 300 of FIG. 4, there is provided a flotation cell 75 which treats rejects stream 28 from the first centrifugal cleaning stage along with accepts stream 38' from the third centrifugal cleaning stage. Stream 38' is combined with rejects stream 28 and fed to the flotation stage where hydrophobic material is removed and an intermediate purified stream 28' is produced. Stream 28' is fed to the second stage 14 of centrifugal cleaners. The accepts stream from stage 14 is fed forward as stream 32" and combined with stream 26 in thickening device 28. The hydrophobic rejects (21') from flotation stage (75) are removed from system 300.

Apparatus 400 of FIG. 5 resembles apparatus 200 of FIG. 3 except that there is provided a preliminary stage 12' of centrifugal cleaners, the accepts stream 26" of which is utilized as the feed to stage 12. Rejects stream 28" of stage 12' is combined with rejects stream 28 of stage 12 and fed to flotation stage 75. Accepts stream 32' of the second stage cleaners is fed forward with accepts stream 26 of stage 12. The hydrophobic rejects (21') from flotation stage (75) are removed from system 400.

EXAMPLES

Pilot plant trials showed that flotation cells such as the Comer Cybercel® can successfully deink secondary centrifugal cleaner rejects, with better results obtained if the consistency is kept close to 0.6%. Consistency refers to weight percent fiber or associated solids such as ash unless the context indicates otherwise. Results on 42% office waste (Grade A) and 100% office waste (Grade B) are shown in Table 1.

TABLE 1

Pilot Plant Results for Brightness Gain, Dirt + Ash Removal Efficiency on Grades A and B at Halsey and Results Used in Simulation Models

| Grade: | A | B | Model |
|---|---|---|---|
| Consistency: | 0.69% | 0.90% | 0.62% |
| Brightness Gain: | 18.5% | 5.3% | |
| Dirt Removal: | 77–89% | 65–87% | 80% |
| Ash removal: | 63% | 64% | 64% |

A simulation model was used to calculate the impact of a Comer Cybercel® flotation cell to deink forward cleaner rejects on solids loss, ash removal and on removal efficiency of mid-dirt (>150 microns) from a $1^{st}$ washer to the deinked pulp (while running grade B at 336 tpd at the $1^{st}$ washer):

TABLE 2

Impact of Flotation Cell on Solids Loss, Ash Loss, and Mid-dirt Removal Efficiency
(according to the Simulation Model for 6 different configurations on Grade B)

| Example | | Solids loss | Ash loss | Mid-dirt Eff. |
|---|---|---|---|---|
| 1 | No Flotation cell | 8.9 tpd | 0.8 tpd | 96.1% |
| 2 | Flotation cell on $2^{nd}$ stage Rejects | 2.7 tpd | 0.9 tpd | 97.0% |
| 3 | Flotation cell on $1^{st}$ stage Rejects | 6.7 tpd | 1.9 tpd | 97.4% |
| 4 | As 3 with 50% eff. in $1^{st}$ stage | 6.7 tpd | 1.9 tpd | 97.7% |
| 5 | Flotation cell on $1^{st}$ stage Rejects + $3^{rd}$ stage accepts, 44% eff. in $1^{st}$ stage | 8.9 tpd | 1.9 tpd | 97.7% |
| 6 | Flotation cell on two $1^{st}$ stages | 11.8 tpd | 2.8 tpd | 98.5% |

The following indicators were used to evaluate the performance of the pilot plant:

feed consistency.

brightness gain of handsheets from accepts compared to feed.

Dirt removal efficiency of small dirt (<150 microns), mid-dirt (>150 microns) and large dirt (>200 microns).

Ash removal efficiency.

The results in Table 3 below for examples 7–14 (duplicate runs) show that even at 0.90% feed consistency it was possible to obtain 5.3 points brightness gain, 73% mid-dirt removal efficiency and 64% ash removal on Grade B. Operating the flotation cell at 0.69% consistency on Grade A, it was possible to obtain 8.1 points brightness gain, 79% mid-dirt removal efficiency and 63% ash removal.

TABLE 3

Comer Pilot Plant Results on $2^{nd}$ stage Cleaner Rejects

| Example | Anal. | Feed Cons. % | Ash % | Brightness Gain | Dirt + Ash Removal % | | | | Comments |
|---|---|---|---|---|---|---|---|---|---|
| | | | | | Small | Mid | Large | Ash | |
| Grade B | | | | | | | | | |
| 7 | 1 | 0.86 | | 3.3 | 88 | 71 | 64 | | |
| | 2 | | 4.4% | 5.8 | 87 | 74 | 65 | 59 | Accepts = 90% > 200 m. |
| 8 | 1 | 0.88 | | 5.4 | 87 | 74 | 67 | | |
| | 2 | | 3.9% | 4.6 | 86 | 69 | 57 | 52 | Accepts = 99% > 200 m. |
| 9 | 1 | 0.88 | | 6.3 | 88 | 78 | 74 | | |
| | 2 | | 5.9% | 5.0 | 87 | 73 | 66 | 68 | |
| 10 | 1 | 0.98 | | 5.9 | 89 | 74 | 61 | | |
| | 2 | | 3.8% | 5.7 | 86 | 69 | 63 | 77 | |
| | Average | 0.90 | 4.5% | 5.3 | 87 | 73 | 65 | 64 | |
| Grade A | | | | | | | | | |
| 11 | 1 | 0.53 | | 7.3 | — | — | — | | |
| | 2 | | 15.9% | 9.4 | 92 | 78 | 72 | | Accepts = 95% > 200 m. |
| 12 | 1 | 0.83 | | 4.2 | 88 | 70 | 60 | 70 | |
| | 2 | | 17.8% | 8.2 | 87 | 70 | 64 | | Accepts = 90% > 200 m. |
| 13 | 1 | 0.70 | | 8.6 | 89 | 88 | 92 | 53 | |
| | 2 | | 16.5% | 8.0 | 89 | 80 | 80 | | Accepts = 74% > 200 m. |
| 14 | 1 | — | | 8.7 | 91 | 85 | 87 | 67 | |
| | 2 | | 23.8% | 10.4 | 89 | 85 | 85 | | |
| | Average | 0.69 | 18.5% | 8.1 | 89 | 79 | 77 | 63 | |

The effect of incorporating a flotation stage in accordance with the present invention into a multistage forward cleaner system was evaluated with a computer model with respect to the systems illustrated in FIGS. 1–5. Results are summarized in the tables below. DIP refers to deinked pulp and DRE refers to dirt removal efficiency.

TABLE 4

System of FIG. 1 - Conventional Multi-Stage Cleaner System

| SUMMARY | | Flow gpm | Cons. % | STPD | Ash % | Ash STPD | Dirt >150 ppm/1.2 g | Dirt >150 m²/day |
|---|---|---|---|---|---|---|---|---|
| Washer | Thick Stock | 540 | 10.37 | 335.7 | 2.53 | 8.5 | 720 | 3310 |
|  | DWw | 4272 | 0.03 | 7.7 | 7 | 0.5 | 1504 | 158 |
| Gyro | Accept | 4812 | 1.19 | 343.4 | 2.63 | 9.0 | 738 | 3468 |
| Gyro | Accept | 4812 | 1.19 | 343.4 | 2.49 | 8.55 | 738 | 3468 |
| Dil. Water |  | 4741 | 0.03 | 8.5 | 7.00 | 0.60 | 1504 | 176 |
| Total In |  | 9553 |  | 351.9 |  | 9.15 |  | 3644 |
| 1st Stage Cleaner | Accept | 9492 | 0.60 | 343.0 | 2.43 | 8.34 | 596 | 2798 |
| Total out | Accept | 9492 |  | 343.0 |  | 8.34 | 596 | 2798 |
| Diff. | In-out | 60 |  | 8.9 |  | 0.8 |  | 846 |
| 5th Stage Cleaner | Rejects | 60 | 2.46 | 8.9 | 9.04 | 0.80 | 6957 | 847 |
| Total | Rejects | 60 |  | 8.9 |  | 0.8 |  | 847 |
| Cleaner to Press DRE: |  |  |  |  |  |  |  | 30.0% DRE |
| Dil. Water | Out | 9334 | 0.03 | 16.8 |  |  |  |  |
| Press | Out | 158.5 | 35.1 | 326.2 | 1.9 | 6.2 | 417 | 1863 |
| Press to DIP DRE: |  |  |  |  |  |  |  | 93.3% DRE |
| DIP |  |  |  |  |  |  | 28 |  |
| PROCESS | Washer - DIP |  |  |  |  |  |  | 96.1% DRE |

TABLE 5

System of FIG. 2 - Multi-Stage Cleaner System with Flotation Cell on 2nd Stage Rejects

| SUMMARY | | Flow gpm | Cons. % | STPD | Ash % | Ash STPD | Dirt >150 ppm/1.2 g | Dirt >150 m²/day |
|---|---|---|---|---|---|---|---|---|
| Washer | Thick Stock | 540 | 10.37 | 335.7 | 2.53 | 8.5 | 720 | 3310 |
|  | DWw | 4272 | 0.03 | 7.7 | 0.7 | 0.1 | 1504 | 16 |
| Gyro | Accept | 4812 | 1.19 | 343.4 | 2.49 | 8.5 | 708 | 3326 |
| Gyro | Accept | 4812 | 1.19 | 343.4 | 2.49 | 8.55 | 708 | 3327 |
| Dil. Water |  | 5666 | 0.03 | 10.2 | 0.70 | 0.70 | 150 | 21 |
| Total In |  | 10478 |  | 353.5 |  | 8.62 |  | 3448 |
| 1st Stage Cleaner | Accept | 9492 | 0.57 | 327.0 | 2.25 | 7.34 | 461 | 2063 |
| 3rd Stage Cleaner | Accept | 927 | 0.43 | 23.8 | 1.39 | 0.33 | 373 | 121 |
| Total out | Accept | 10419 | 0.56 | 350.8 |  | 7.68 | 455 | 2185 |
| Diff. | In-out | 58 |  | 2.7 |  | 0.9 |  | 1164 |
| Comer | Rejects | 42 | 0.93 | 2.3 | 34.77 | 0.81 | 32762 | 1050 |
| 5th Stage Cleaner | Rejects | 16 | 0.36 | 0.3 | 32.88 | 0.11 | 23680 | 113 |
| Total | Rejects | 58 |  | 2.7 |  | 0.9 |  | 1163 |
| Cleaner to Press DRE: |  |  |  |  |  |  |  | 30.0% DRE |
| Dil. Water | Out | 10261 | 0.03 | 18.5 |  |  |  |  |
| Press | Out | 158.5 | 35.1 | 332.4 | 1.9 | 6.3 | 318 | 1449 |
| Press to DIP DRE: |  |  |  |  |  |  |  | 93.3% DRE |
| DIP |  |  |  |  |  |  | 21.3 |  |
| PROCESS | Washer - DIP |  |  |  |  |  |  | 97.0% DRE |

TABLE 6

System of FIG. 3 - Multi-Stage Cleaner System with Flotation on 1st Stage Rejects

| SUMMARY | | Flow gpm | Cons. % | STPD | Ash % | Ash STPD | Dirt >150 ppm/1.2 g | Dirt >150 m²/day |
|---|---|---|---|---|---|---|---|---|
| Washer | Thick Stock | 540 | 10.37 | 335.7 | 2.53 | 8.5 | 720 | 3310 |
| | DWw | 4272 | 0.03 | 7.7 | 0.7 | 0.1 | 150.4 | 16 |
| Gyro | Accept | 4812 | 1.19 | 343.4 | 2.49 | 8.5 | 708 | 3326 |
| Gyro | Accept | 4812 | 1.19 | 343.4 | 2.49 | 8.55 | 708 | 3327 |
| Dil. Water | | 7449 | 0.03 | 13.4 | 0.70 | 0.09 | 150 | 28 |
| Total in | | 12261 | | 356.8 | | 8.64 | | 3355 |
| 1st Stage Cleaner | Accept | 9492 | 0.50 | 282.9 | 2.13 | 6.04 | 443 | 1715 |
| 2nd Stage Cleaner | Accept | 2679 | 0.42 | 67.1 | 1.12 | 0.75 | 191 | 175 |
| Total out | Accept | 12171 | 0.48 | 350.1 | | 6.79 | 394 | 1890 |
| Diff. | In-out | 90 | | 6.7 | | 1.85 | | 1465 |
| Comer | Rejects | 74 | 1.45 | 6.4 | 25.91 | 1.66 | 15279 | 1337 |
| 5th Stage Cleaner | Rejects | 16 | 0.28 | 0.3 | 69.31 | 0.19 | 34056 | 128 |
| Total | Rejects | 90 | | 6.7 | | 1.85 | | 1465 |
| | Cleaner to Press DRE: | | | | | | | 30.0% DRE |
| Dil. Water | Out | 12012 | 0.03 | 21.6 | | | | |
| Press | Out | 158.5 | 35.1 | 328.5 | 1.9 | 6.2 | 276 | 1241 |
| | Press to DIP DRE: | | | | | | | 93.3% DRE |
| DIP | | | | | | | 18.5 | |
| PROCESS | Washer - DIP | | | | | | | 97.4% DRE |

TABLE 7

System of FIG. 4 - Multi-Stage Cleaner System with Flotation on 1st St. Rejects + 3rd St. Accepts

| SUMMARY | | Flow gpm | Cons. % | STPD | Ash % | Ash STPD | Dirt >150 ppm/1.2 g Double-dirt | Dirt >150 m²/day |
|---|---|---|---|---|---|---|---|---|
| Washer | Thick Stock | 546 | 10.37 | 339.5 | 2.51 | 8.52 | 1489 | 6921 |
| | DWw | 4266 | 0.015 | 3.8 | 0.7 | 0.0 | 300 | 16 |
| | Accept | 4812 | 1.19 | 343.4 | 2.49 | 8.55 | 1476 | 6937 |
| Gyro | Accept | 4812 | 1.19 | 343.4 | 2.49 | 8.55 | 1476 | 6937 |
| Dil. Water | | 7543 | 0.015 | 6.8 | 0.70 | 0.05 | 300 | 28 |
| Total in | | 12355 | | 350.1 | | 8.60 | | 6965 |
| 1st Stage Cleaner | Accept | 10100 | 0.46 | 279.2 | 2.15 | 6.01 | 816 | 3118 |
| 2nd Stage Cleaner | Accept | 2104 | 0.50 | 62.9 | 1.16 | 6.74 | 729 | 3416 |
| Total out | Accept | 12204 | 0.47 | 342.2 | 1.97 | 0.73 | 346 | 298 |
| Diff. | In-out | 151 | | 8.0 | | 1.9 | | 3549 |
| Comer | Rejects | 143 | 0.91 | 7.8 | 23.75 | 1.85 | 31464 | 3347 |
| 5th Stage Cleaner | Rejects | 8 | 0.41 | 0.2 | 7.68 | 0.02 | 72988 | 202 |
| Total | Rejects | 151 | | 8.0 | | 1.9 | | 3649 |
| | Cleaner to Press DRE: | | | | | | | 30.0% DRE |
| Dil. Water | Out | 12045 | 0.015 | 10.8 | | | | |
| Press | Out | 158.5 | 35.1 | 331.3 | 1.9 | 6.3 | 511 Double-dirt | 2316 |
| | Press to DIP DRE: | | | | | | | 93.3% DRE |
| DIP | | | | | | | 34 Double-dirt | |
| PROCESS | Washer - DIP | | | | | | | 97.7% DRE |

Note:
Mid-dirt level at the Gyro was doubled from 738 to 1476 ppm in this simulation, which results in double-dirt figures at the press and in the DIP. (Divide by 2 for comparison with simulations in Tables 4–6).

TABLE 8

System of FIG. 5 - Multi-Stage Cleaner System with Flotation Cell on both 1st Stage Rejects.

| SUMMARY | | Flow gpm | Cons. % | STPD | Ash % | Ash STPD | Dirt >150 ppm/1.2 g double-dirt | Dirt >150 m²/day |
|---|---|---|---|---|---|---|---|---|
| Washer | Thick Stock | 546 | 10.37 | 339.5 | 2.51 | 8.5 | 1489 | 6920 |
|  | DWw | 4266 | 0.015 | 3.8 | 0.7 | 0.0 | 300 | 16 |
| Gyro | Accept | 4812 | 1.19 | 343.3 | 2.49 | 8.5 | 1476 | 6935 |
| Gyro | Accept | 4812 | 1.19 | 343.4 | 2.49 | 8.55 | 1476 | 6937 |
| Dil. Water |  | 7431 | 0.015 | 6.7 | 0.70 | 0.05 | 300 | 27 |
| Total in |  | 12243 |  | 350.0 |  | 8.60 |  | 6964 |
| 1st Stage Cleaner 2 | Accept | 8417 | 0.44 | 223.0 | 1.89 | 4.21 | 523 | 1596 |
| 2nd Stage Cleaner | Accept | 3619 | 0.53 | 115.3 | 136 | 1.56 | 388 | 612 |
| Total out | Accept | 12036 | 0.47 | 338.3 |  | 5.77 | 477 | 2208 |
|  |  | 12036 | 0.55 | 400.0 |  |  |  |  |
| Diff. | In-out | 208 |  | 11.8 |  | 2.8 |  | 4756 |
| Comer | Rejects | 192 | 0.99 | 11.4 | 24.65 | 2.81 | 28167 | 4389 |
| 5th Stage Cleaner | Rejects | 16 | 0.39 | 0.4 | 8.54 | 0.03 | 71490 | 367 |
| Total | Rejects | 208 |  | 11.8 |  | 2.8 |  | 4756 |
|  | Cleaner to Press DRE: |  |  |  |  |  | 30.0% DRE |  |
| Dil. Water | Out | 11856 | 0.015 | 10.7 | 0.70 | 0.1 |  |  |
| Press | Out | 180.0 | 35.16 | 327.6 | 1.74 | 5.7 | 334 | 1497 |
|  |  |  |  | 379.5 |  |  | double-dirt |  |
|  | Press to DIP DRE: |  |  |  |  |  | 93.3% DRE |  |
| DIP |  |  |  |  |  |  | 22 |  |
|  |  |  |  |  |  |  | double-dirt |  |
| PROCESS | Washer - DIP |  |  |  |  |  | 98.5% DRE |  |

Note:
Mid-dirt level at the Gyro was doubled from 738 to 1476 ppm in this simulation, which results in double-dirt figures at the press and in the DIP. (Divide by 2 for comparison with simulations in Tables 4–6).

The process of the present invention is particularly useful in connection with thin stock processing of recycle fiber, wherein the aqueous stream has a consistency of less than about 1% during such processing. Thin stock processing is employed in connection with commercial recycling operations, following pulping, thick stock cleaning and washing prior to thickening and bleaching, for example. In a preferred thin stock process in accordance with the invention, the thin stock is screened in a screening device with a screening dimension of less than about 10 mils to generate a screened accepts aqueous stream which, in turn, is fed to a hybrid sytem such as shown in FIG. 4, for example. The screening dimension of the screening device is the slot width of a slotted screen basket, or could be the hole diameter of an alternate screening device.

Figure 6:
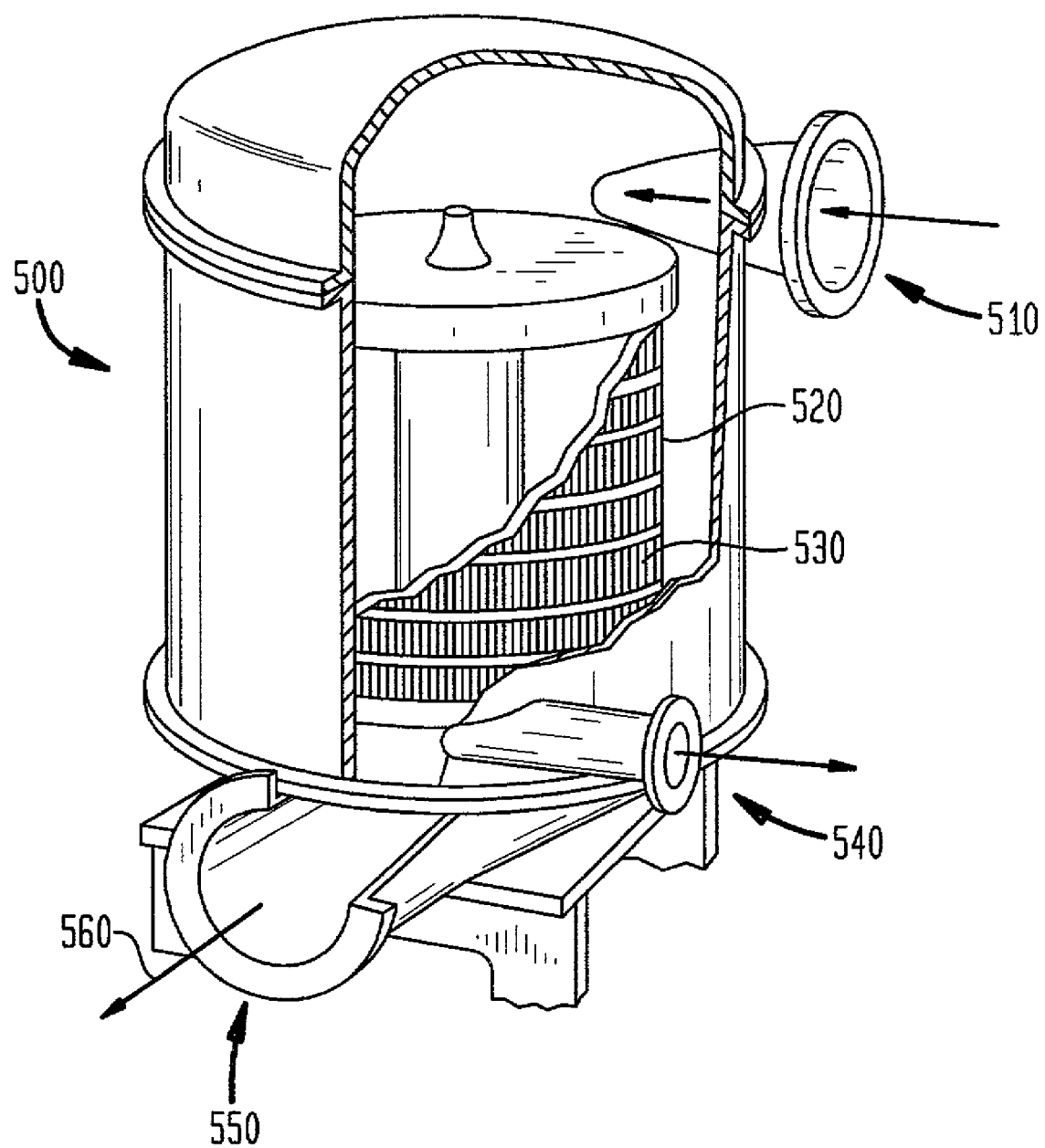
FIG. 6 is a side broken away view of a screen containing a slotted basket.

Slotted screening devices are preferred and are well known. There is shown in FIG. 6 such a slotted screening device 500 provided with a feed port 510, a screen 520 provided with a plurality of elongated slots such as slots 530, a rejects outlet 540 as well as an accepts outlet 550. A feed stream is fed at 510 while the rejects stream is withdrawn at 540 and the screened accepts aqueous stream 560 exits outlet 550. Accepts stream 560 may then be fed forward to a first stage bank of centrifugal cleaners for further dilution and processing as described above.

Slotted screens having a slot width of 8 mils or less may be employed. In commercial processes, fine slotted screens of 6 mils are frequently employed.

A commercial operation utilizing thin stock processing as part of its secondary fiber processing was operated with a hybrid system as shown and described in connection with FIG. 4 above. The multistage array of forward cleaners was fed with thin stock which had been screened with 6 mil slotted screens prior to being fed to the forward cleaners.

The particular arrangement included in sequence fine slotted screens, gyrocleans followed by the forward cleaner/flotation cell system. The flotation cell employed was a Comer-Cybercell™ device which is preferably operated without diffuser plates. The system was installed along with expansion of a disk thickener downstream of thin stock processing of the fiber. As a result of this project the cleaners started performing better (improved dirt removal efficiency) and the hybrid cleaner-flotation cell removed approximately 80% of the dirt, 63% of the stickies and 53% of the ash in the Comer feed with a brightness increase of 2.4% points. Process mid dirt removal efficiency increased 2.4% (from 96.9% to 98.3%) when running mixed office waste ("MOW") recycle fiber at 540 ton per day (tpd) input rate. The paper machines have run without stickies problems for 8 months since the Comer cell came on line.

The new treatment protocol operated well on a furnish containing 100% mixed office waste (MOW) as shown in Table 9, which compares mid dirt removal efficiency (MDRE)>0.02–0.5 mm² before and after Comer flotation cell start-up:

TABLE 9

Mid Dirt Removal Efficiency Before and After Start-up of Hybrid Cleaner - Comer Flotation Cell on a Furnish Containing 100% Mixed Office Waste (MOW)

| | Mid Dirt Removal Efficiency of Dirt > 0.02–0.5 mm² | | | | | |
|---|---|---|---|---|---|---|
| Time Period | Process | Cleaner | Comer-Cleaner | Thickener | Disperger | Disperger - DIP |
| Before Hybrid | 96.4% | 45% | 53% - clnr | 21% | 74% | 70% |

TABLE 9-continued

Mid Dirt Removal Efficiency Before and After Start-up of Hybrid Cleaner - Comer Flotation Cell on a Furnish Containing 100% Mixed Office Waste (MOW)

Mid Dirt Removal Efficiency of Dirt > 0.02–0.5 mm$^2$

| Time Period | Process | Cleaner | Comer-Cleaner | Thickener | Dis-perger | Disperger - DIP |
|---|---|---|---|---|---|---|
| After Hybrid | 97.7% | 50% | 79% | 13% | 78% | 73% |

Figure 7:
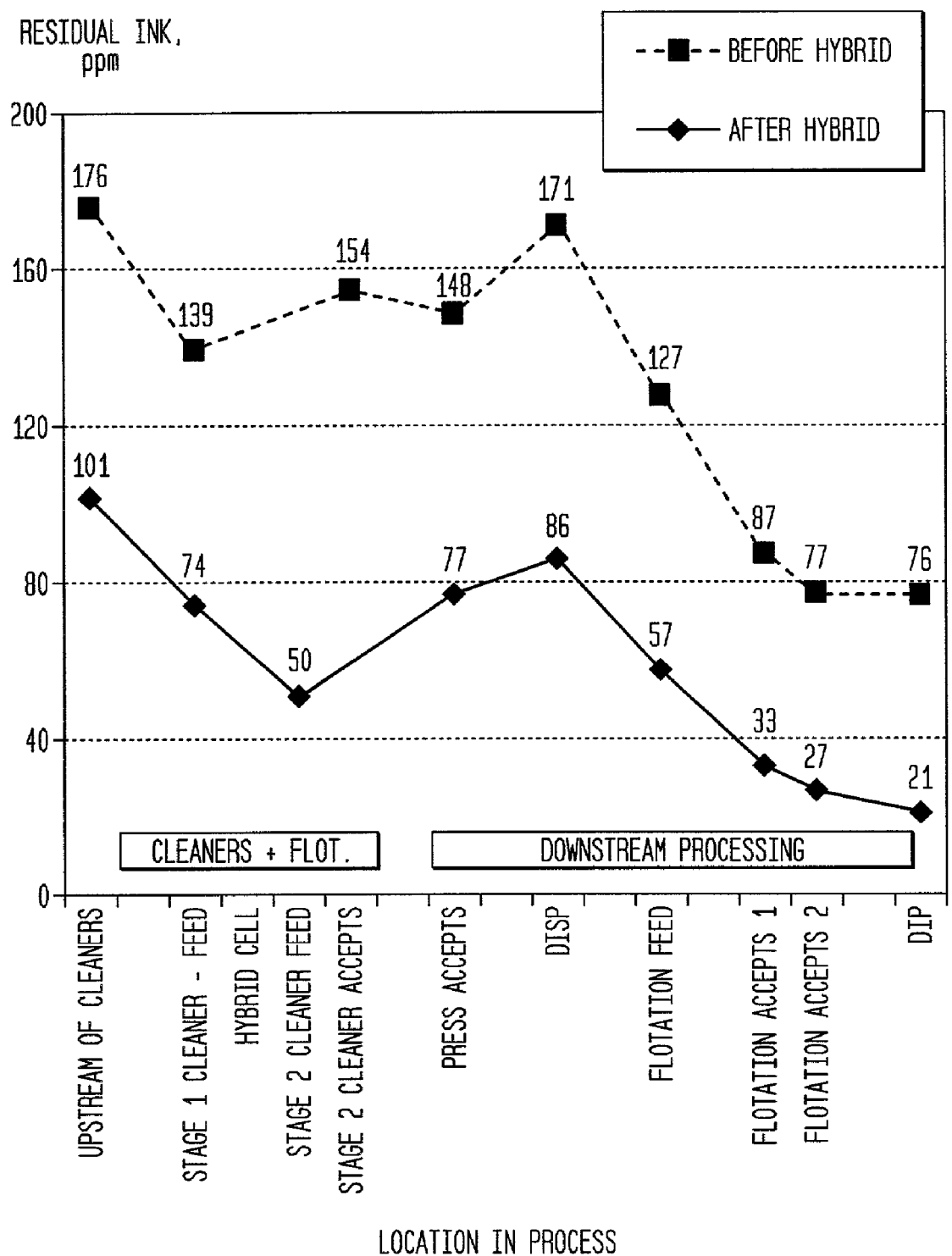
FIG. 7 is a plot of residual ink concentration versus location in the pulp cleaning system.

The Effective Residual Ink Concentration (ERIC) also improved throughout the whole deinking system as can be seen in FIG. 7. ERIC levels in the deinked pulp dropped from 76 ppm without the inventive thin stock cleaning method to 21 ppm with the hybrid fiber when running MOW fiber at 365 tpd.

The performance of the hybrid cleaner—flotation cell is summarized in Table 10. It shows 2.4% points brightness increase, 82% total dirt removal efficiency (TDRE) and 53% ash reduction across the combination. The quality of the $2^{nd}$ stage cleaner accepts was even better than the first stage cleaner accepts.

TABLE 10

Hybrid Cleaner - Flotation Cell Results Operating On $1^{st}$ Stage Cleaner Rejects

| Unit Operation | Feed | | | Brightness | Dirt Removal Efficiency | | | Ash |
|---|---|---|---|---|---|---|---|---|
| | Cons | Ash | Br. | Gain | Small | MDRE | TDRE | Removal |
| Comer | 0.65% | 2.0% | 70.9% | 2.0% pts | 78.8% | 64.3% | 71.0% | 50% |
| St. 2 Cleaner | 0.58% | 1.0% | 72.9% Accepts | 0.4% pts | 47.2% | 51.2% | 49.7% | 10% |
| Comer-clnr | 0.49% | 0.9% | 73.3% | 2.4% pts | 85.3% | 79.1% | 82.0% | 53% |

*Br. Is brightness of feed and accepts, MDRE is mid dirt removal efficiency and TDRE is total dirt removal efficiency.

In the plant, the number of stickies in the deinked pulp are counted 3 times per shift by screening a 150 gram sample of deinked pulp on a flat screen with 0.006 inch slots. The count for MOW based fiber averaged 3.3 stickies per 150 grams before installation of the hybrid system and improved to 1.3 stickies per 150 grams after implementation of the process.

The area of stickies retained on a Pulmac® screen with 4 mil slots was also measured for selected samples. The uncompressed stickies are then counted using a microscope equipped with a grid to estimate the size of the stickies. Two sets of samples were obtained at 4 locations in the overall pulp-cleaning process at a first date, prior to installation and operation of the hybrid cleaner system (Data Set A), at 12 locations at a second date, also prior to installation of the hybrid cleaner system (Data Set B) and again at 8 locations in the process at a third date while the hybrid system shown in FIG. 4 was operating (Data Set C). The average results of 20 gram stock samples for each location are shown in Table 11. The improvement in total stickies removal efficiency from 95.0% to 98.5% is attributed in part to the improved operation of the hybrid forward cleaning system over forward cleaners alone.

TABLE 11

Comparative Stickies Removal
(Small stickies = <0.28 mm$^2$; Large stickies = 0.28–1.47 mm$^2$; X-Large stickies = >1.47 mm$^2$)

| Process Location and Data Set | Pulmac Stickies (mm$^2$/100 grams) | | | | Total Removal Efficiency |
|---|---|---|---|---|---|
| | Small | Large | X-Large | Total | |
| Data Set A | | | | | |
| High Density Cleaner | 72 | 219 | 119 | 409 | |
| $1^{st}$ Washer - out | 76.9 | 51.3 | 10 | 138 | $1^{st}$ washer-DIP = 85.3% |
| Disperger - in | 49.1 | 0 | 0 | 49 | |
| Deinked Pulp | 20.3 | 0 | 0 | 20 | HDCl-DIP = 95.0% |
| Data Set B | | | | | |
| $1^{st}$ Washer - out | 64.0 | 13.3 | 0 | 77 | $1^{st}$ washer-DIP = 91.0% |
| Fine Slotted Screens - out | 50.8 | 3.1 | 0 | 54 | |
| St.1 Cleaner - in | 42.9 | 0.5 | 0 | 43 | |
| St.1 Cleaner - out | 36.9 | 2.8 | 0 | 40 | |
| St.2 Cleaner - out | 43.6 | 0 | 0 | 44 | |
| Disperger - in | 48.9 | 2.7 | 0 | 52 | |
| Disperger - out | 31.9 | 0 | 0 | 32 | |
| Deinked Pulp | 6.8 | 0 | 0 | 7 | |
| Data Set C | | | | | |
| High Density Cleaner | 102 | 168 | 37 | 306 | |
| $1^{st}$ Washer - out | 54.7 | 10.9 | 0 | 66 | $1^{st}$ washer-DIP = 93.0% |
| Fine Slotted Screens - out | 53.1 | 0 | 0 | 53 | |
| Comer cell - Feed | 48.8 | 0 | 0 | 49 | Comer in-out = 62% |
| Comer Cell - Accepts | 18.1 | 0.6 | 0 | 19 | |
| Disperger - in | 35.9 | 0 | 0 | 36 | Disp. in-out = 34% |
| Disperger-out | 21.6 | 0 | 0 | 22 | |
| Deinked Pulp | 4.6 | 0 | 0 | 5 | HDCl-DIP = 98.5% |

It can be seen from Table 11 that the Comer cell was particularly effective in removing small stickies, removing over 60 percent of the stickies in the feed to the flotation cell.

While the invention has been illustrated in connection with numerous embodiments, modifications to those embodiments within the spirit and scope of the present invention, set forth in the appended claims, will be readily apparent to those of skill in the art.

What is claimed is:

1. A method of processing papermaking fibers with a multistage array of forward cleaners including a plurality of centrifugal cleaners configured to generate accepts streams and rejects streams which concentrate hydrophobic contaminants, said method comprising:
   (a) feeding a first aqueous feed stream including papermaking fibers to a first stage bank of centrifugal cleaners of said multistage array;
   (b) generating a first accepts aqueous stream and a first rejects aqueous stream in said first stage bank of centrifugal cleaners, said first aqueous rejects stream being enriched in heavy hydrophobic contaminants with respect to said first aqueous feed stream;
   (c) supplying said first rejects aqueous stream to a flotation stage;
   (d) treating said first rejects aqueous stream in said flotation stage to selectively remove hydrophobic waste from said first aqueous rejects stream and produce an intermediate aqueous purified feed stream;
   (e) feeding said aqueous purified intermediate feed stream forward to a second stage bank of centrifugal cleaners of said multistage array, said second centrifugal cleaner being configured to generate a second accepts aqueous stream; and
   (f) combining said first accepts aqueous stream with said second accepts aqueous stream to form a combined accepts stream.

2. The method according to claim 1, further comprising the step of thickening said combined accepts stream.

3. The method according to claim 1, wherein said first aqueous feed stream has a consistency of less than about 1%.

4. The method according to claim 1, wherein said first aqueous feed stream has a consistency of from about 0.3% to about 0.9%.

5. The method according to claim 4, wherein said first aqueous feed stream has a consistency of from about 0.4% to about 0.7%.

6. The method according to claim 1, wherein said multistage array of forward cleaners comprises at least 3 banks of centrifugal cleaners.

7. The method according to claim 1, wherein the hydrophobic contaminants removed from said first aqueous rejects stream by said flotation stage includes an ink composition.

8. The method according to claim 7, wherein said ink composition is a toner ink composition.

9. The method according to claim 8, wherein the hydrophobic contaminants removed from said first aqueous rejects stream by said flotation stage comprises an ink composition and stickies.

10. The method according to claim 9, wherein said ink composition comprises a toner ink composition and said stickies comprise stickies derived from pressure sensitive adhesives.

11. The method according to claim 1, operative to improve brightness of treated pulp as compared with like pulp subjected to like treatment without flotation treatment of a rejects stream.

12. The method according to claim 1, operative to reduce effective residual ink concentration in treated pulp as compared with like pulp subjected to like treatment without flotation treatment of a rejects stream.

13. The method according to claim 1, operative to reduce the stickies content in treated pulp, as compared with like pulp subjected to like treatment without flotation treatment of a rejects stream.

14. The method according to claim 1, operative to improve the dirt removal efficiency of a multi-stage array of forward cleaners as compared with a like system without flotation treatment of a rejects stream.

* * * * *

UNITED STATES PATENT AND TRADEMARK OFFICE
CERTIFICATE OF CORRECTION

PATENT NO. : 7,063,770 B2
APPLICATION NO. : 10/099610
DATED : June 20, 2006
INVENTOR(S) : Robert L. de Jong et al.

It is certified that error appears in the above-identified patent and that said Letters Patent is hereby corrected as shown below:

In Col. 2, line 30, delete "alot" and insert --a lot--;
In Col. 3, line 11, insert --which-- before "includes";
In Col. 3, line 44, insert --a-- before "centrifugal";
In Col. 4, line 30, delete "form" and insert --from--;
In Col. 4, line 57, delete "interfrere" and insert --interfere--;
In Col. 6, line 60, delete "a" before "recycled";
In Col. 7, line 21, delete "at" after "forward";
In Col. 8, line 20, delete "here" and insert --herein--;
In Col. 10 (Table 2), line 13, change "accepts" to --Accepts--;
In Col. 10, line 20, change "feed" to --Feed--;
In Col. 10, line 21, change "brightness" to --Brightness--;
In Cols. 9-10 (Table 3), Example Grade B, under Col. identified as "Anal.", last line before "Average", insert --2--;
In Cols. 13-14 (Table 7), under Col. identified as "SUMMARY", insert --Gyro-- above "Gyro";
In Cols. 13-14 (Table 7), under Col. identified as "Ash STPD", delete "6.74" and insert --0.73--;
In Cols. 13-14 (Table 7), under Col. identified as "Ash STPD", delete "0.73" and Insert --6.74--;
In Cols. 13-14 (Table 7), under Col. identified as "Dirt>150, ppm/1.2 g, Double-dirt", delete "729" and insert --346--;
In Cols. 13-14 (Table 7), under Col. identified as "Dirt>150, ppm/l.2 g, Double-dirt", delete "346" and insert --729--;
In Cols. 13-14 (Table 7), under Col. identified as "Dirt>, m /day", delete "3416" and insert --298--;
In Cols. 13-14 (Table 7), under Col. identified as "Dirt>, m /day", delete "298" and insert --3416--;
In Cols. 13-14 (Table 7), under Col. identified as "Dirt>, m /day", delete "3649" and insert --3549--;
In Cols. 15-16 (Table 8), under Col. identified as "Ash %", change "136" to --1.36--;
In Col. 15, line 45, delete "sytem" and insert --system--;
In Col. 15, line 59, unbold "8";
In Col. 15, line 61, unbold "6";
In Col. 15, line 66, unbold "6";
In Col. 17, line 17, delete "ftom" and insert --from--; and

UNITED STATES PATENT AND TRADEMARK OFFICE
CERTIFICATE OF CORRECTION

PATENT NO. : 7,063,770 B2
APPLICATION NO. : 10/099610
DATED : June 20, 2006
INVENTOR(S) : Robert L. de Jong et al.

It is certified that error appears in the above-identified patent and that said Letters Patent is hereby corrected as shown below:

In Col. 17 (Table 10), delete "Br." and insert --Br.*--.

Signed and Sealed this

Twenty-sixth Day of December, 2006

JON W. DUDAS
*Director of the United States Patent and Trademark Office*